US011453781B2

(12) United States Patent
Ai

(10) Patent No.: US 11,453,781 B2
(45) Date of Patent: Sep. 27, 2022

(54) NANO DYE MOLECULE, COLOR FILTER, AND DISPLAY PANEL

(71) Applicant: TCL CHINA STAR OPTOELECTRONICS TECHNOLOGY CO., LTD., Guangdong (CN)

(72) Inventor: Lin Ai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 368 days.

(21) Appl. No.: 16/627,806

(22) PCT Filed: Dec. 27, 2019

(86) PCT No.: PCT/CN2019/129080
§ 371 (c)(1),
(2) Date: Dec. 31, 2019

(87) PCT Pub. No.: WO2021/120294
PCT Pub. Date: Jun. 24, 2021

(65) Prior Publication Data
US 2021/0179854 A1    Jun. 17, 2021

(30) Foreign Application Priority Data

Dec. 17, 2019   (CN) .......................... 201911303946.4

(51) Int. Cl.
C09B 41/00       (2006.01)
C09B 55/00       (2006.01)
(Continued)

(52) U.S. Cl.
CPC ................ *C09B 47/24* (2013.01); *C09B 5/62* (2013.01); *C09B 41/00* (2013.01); *C09B 55/009* (2013.01);
(Continued)

(58) Field of Classification Search
CPC  C09B 5/62; C09B 41/00; C09B 47/24; C09B 55/009; C09B 67/0032;
(Continued)

(56) References Cited

U.S. PATENT DOCUMENTS

2007/0275383 A1   11/2007  Vocanson
2011/0077342 A1*   3/2011  Hidalgo ................... C08F 2/20
                                                           524/460
(Continued)

FOREIGN PATENT DOCUMENTS

CN           1864066 A       11/2006
CN           1973588 A        5/2007
(Continued)

OTHER PUBLICATIONS

Chenming Xue, Ozgul Birel, Min Gao, Sheng Zhang, Liming Dai, Augustine Urbas, and Quan Li, Perylene Monolayer Protected Gold Nanorods: Unique Optical, Electronic Properties and Self-Assemblies, J. Phys. Chem. C 2012, 116, 10396-10404. (Year: 2012).*

(Continued)

*Primary Examiner* — Bijan Ahvazi
(74) *Attorney, Agent, or Firm* — Mark M. Friedman

(57) ABSTRACT

The present disclosure provides a nano dye molecule, a color filter, and a display panel. The nano dye molecule comprises a gold nanocluster and a plurality of dye groups which are connected to the gold nanocluster by gold-sulfur bonds and cover an outer periphery of the gold nanocluster.

14 Claims, 1 Drawing Sheet

(51) Int. Cl.

| | | |
|---|---|---|
| *C09B 67/00* | (2006.01) | |
| *G02F 1/1335* | (2006.01) | |
| *C09B 47/24* | (2006.01) | |
| *C09B 5/62* | (2006.01) | |
| *B82Y 40/00* | (2011.01) | |
| *B82Y 30/00* | (2011.01) | |
| *B82Y 20/00* | (2011.01) | |

(52) U.S. Cl.
CPC .... *C09B 67/0032* (2013.01); *G02F 1/133514* (2013.01); *B82Y 20/00* (2013.01); *B82Y 30/00* (2013.01); *B82Y 40/00* (2013.01); *G02F 2202/04* (2013.01); *G02F 2202/36* (2013.01)

(58) Field of Classification Search
CPC ........... G02F 1/133514; G02F 2202/04; G02F 2202/36; B82Y 30/00
See application file for complete search history.

(56) References Cited

U.S. PATENT DOCUMENTS

| | | |
|---|---|---|
| 2013/0149247 A1 | 6/2013 | Qian et al. |
| 2014/0186854 A1 | 7/2014 | Salafsky |
| 2014/0187431 A1 | 7/2014 | Salafsky |
| 2014/0187432 A1 | 7/2014 | Salafsky |
| 2014/0187433 A1 | 7/2014 | Salafsky |

FOREIGN PATENT DOCUMENTS

| | | |
|---|---|---|
| CN | 101592840 A | 12/2009 |
| CN | 101604121 A | 12/2009 |
| CN | 101679022 A | 3/2010 |
| CN | 103342999 A | 10/2013 |
| CN | 104230944 A | 12/2014 |
| CN | 104308182 A | 1/2015 |
| CN | 105689735 A | 6/2016 |
| CN | 107219212 A | 9/2017 |
| TW | 201223546 A | 6/2012 |
| WO | 03018645 A1 | 3/2003 |
| WO | 2007079585 A1 | 7/2007 |
| WO | 2015017722 A2 | 2/2015 |

OTHER PUBLICATIONS

B Bassi, A Taglietti, P Galinetto, , N Marchesi, A Pascale, P Pallavicini and G Dacarro, Tunable coating of gold nanostars: tailoring robust SERS labels for cell imaging,Nanotechnology 27 (2016) 265302, 1-11. (Year: 2016).*

* cited by examiner

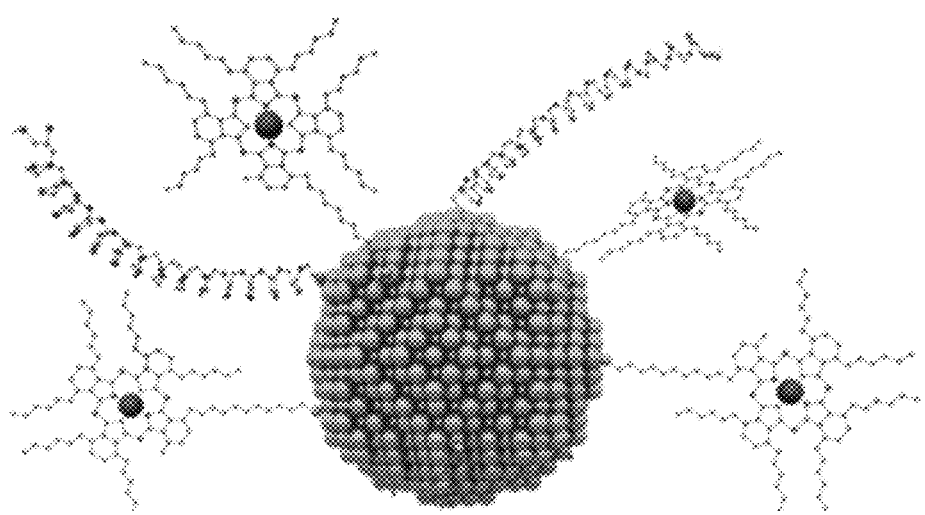

NANO DYE MOLECULE, COLOR FILTER, AND DISPLAY PANEL

FIELD OF INVENTION

The present disclosure relates to the field of display technologies, and more particularly, to a nano dye molecule, a color filter, and a display panel.

BACKGROUND OF INVENTION

With rapid development of display technologies, various new display technologies are developed and cause a great competition to liquid crystal displays (LCDs). However, because LCDs have advantages of mature technologies, low power consumptions, cost advantages, and excellent display quality, and mass production of new technologies still needs to be improved, LCDs will still occupy major consumer markets for many years to come. With maturity of liquid crystal display technologies, requirements for quality of LCD display images are getting higher, which also fosters the techniques of high brightness, high contrast, fast responses, wide viewing angles, and high-dynamic range (HDR). Therefore, the display quality of LCD display images is improved greatly.

In recent years, the LCD technologies are getting optimized and renewing. The development of new technologies, such as 8K4K, IGZO, and duel cell, has a higher requirement for transmittances of display panels. As an important constraint, color photoresist materials also need to be optimized and improved, other than optimizing backlight, polarizers, and pixel designs. Development of current color photoresist materials is in the transition from large particle (typically greater than 30 nm) crystalline pigments to dye molecules. One reason is that dye molecules have better color tinting power, and another aspect is that molecular types of dyes prevent penetration and low contrast caused by scattering effects of light in the propagation light path. However, due to limitations of self-heat resistances of dyes and other process stability, the development thereof is slower.

Technical Problem

The present disclosure provides a nano dye molecule, a color filter, and a display panel. Sizes of the nano dye molecules have good stability and uniformity, so the color filter manufactured by the nano dye molecule has a higher transmittance, and the display panel including the color filter has a higher contrast.

SUMMARY OF INVENTION

In a first aspect, the present disclosure provides a nano dye molecule. The nano dye molecule comprises:
a gold nanocluster; and
a plurality of dye groups connected to the gold nanocluster by gold-sulfur bonds and covering an outer periphery of the gold nanocluster.

In the nano dye molecule provided by an embodiment of the present disclosure, a structure of the nano dye molecule is represented by a following formula (1):

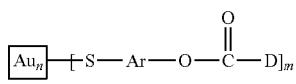
(1)

wherein $Au_n$ represents the gold nanocluster, and n is an integer ranging from 100 to 300;
Ar is an alkyl group having 2 to 12 carbon atoms;
D is a dye group; and
m is an integer ranging from 5 to 20.

In the nano dye molecule provided by an embodiment of the present disclosure, wherein the dye groups are one selected from the group consisting of red dye groups, green dye groups, blue dye groups, yellow dye groups, and white dye groups.

In the nano dye molecule provided by an embodiment of the present disclosure, a structure of the dye groups is one selected from the group consisting of following structural formulas:

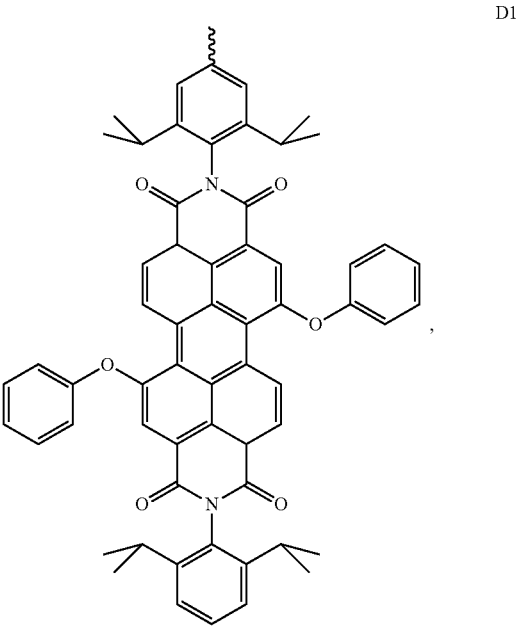

D1

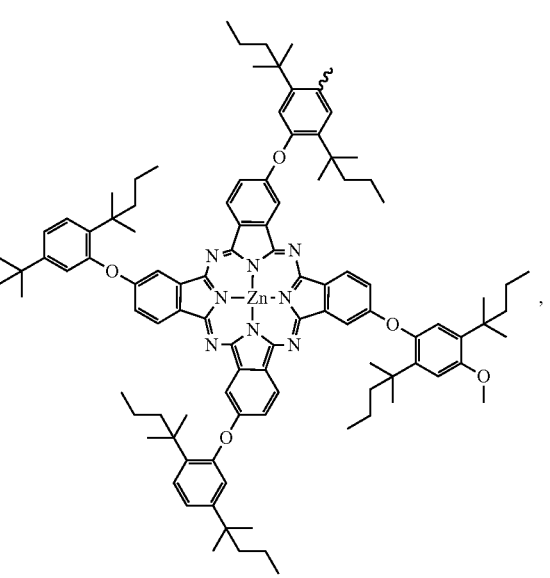

D2

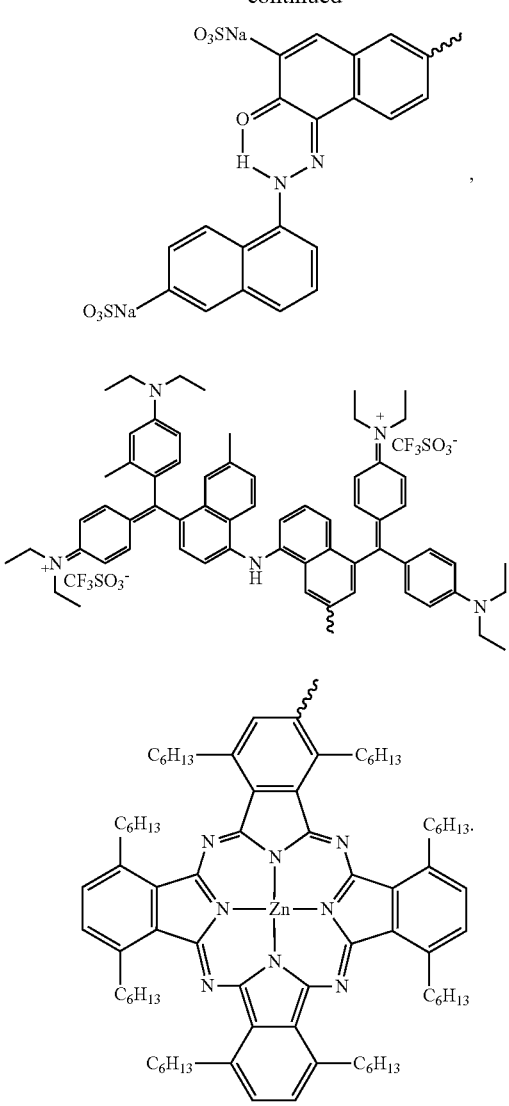

The nano dye molecule provided by an embodiment of the present disclosure further comprises polyethylene glycol groups, wherein the polyethylene glycol groups are connected to the gold nanocluster by gold-sulfur bonds, cover the outer periphery of the gold nanocluster, and have carboxyl groups at ends of the polyethylene glycol groups.

In the nano dye molecule provided by an embodiment of the present disclosure, a structure of the nano dye molecule is represented by a following formula (2):

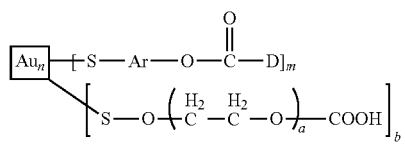

(2)

wherein $Au_n$ represents the gold nanocluster, and n is an integer ranging from 100 to 300;
Ar is an alkyl group having 2 to 12 carbon atoms;
D is a dye group;
m is an integer ranging from 5 to 20;
a is an integer ranging from 10 to 100; and
b is an integer ranging from 3 to 10.

In the nano dye molecule provided by an embodiment of the present disclosure, wherein the outer periphery of the gold nanocluster of the nano dye molecule is further covered by a plurality of alkyl ammonium bromide molecules to make an electrostatic repulsive force is formed between any of the adjacent nano dye molecules.

In the nano dye molecule provided by an embodiment of the present disclosure, wherein the outer periphery of the gold nanocluster of the nano dye molecule is further covered by 3 to 10 of the alkyl ammonium bromide molecules, and the alkyl ammonium bromide molecules are at least one selected from the group consisting of tetrabutylammonium bromide, tetrahexylammonium bromide, and tetraoctylammonium bromide.

In a second aspect, the present disclosure further provides a color filter. The color filter comprises nano dye molecules, wherein the nano dye molecules comprise:
gold nanoclusters; and
a plurality of dye groups connected to the gold nanoclusters by gold-sulfur bonds and covering outer peripheries of the gold nanoclusters.

In the color filter provided by an embodiment of the present disclosure, a mass percentage of the nano dye molecules ranges from 2% to 8%.

In the color filter provided by an embodiment of the present disclosure, a structure of the nano dye molecules is represented by a following formula (1):

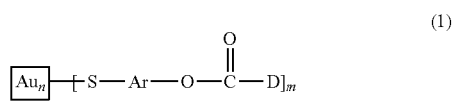

(1)

wherein $Au_n$ represents the gold nanocluster, and n is an integer ranging from 100 to 300;
Ar is an alkyl group having 2 to 12 carbon atoms;
D is a dye group; and
m is an integer ranging from 5 to 20.

In the color filter provided by an embodiment of the present disclosure, wherein the dye groups are one selected from the group consisting of red dye groups, green dye groups, blue dye groups, yellow dye groups, and white dye groups.

In the color filter provided by an embodiment of the present disclosure, wherein the nano dye molecules further comprise polyethylene glycol groups, wherein the polyethylene glycol groups are connected to the gold nanoclusters by gold-sulfur bonds, cover the outer peripheries of the gold nanoclusters, and have carboxyl groups at ends of the polyethylene glycol groups.

In the color filter provided by an embodiment of the present disclosure, wherein the outer peripheries of the gold nanoclusters of the nano dye molecules are further covered by a plurality of alkyl ammonium bromide molecules to make an electrostatic repulsive force is formed between any of the adjacent nano dye molecules.

In the color filter provided by an embodiment of the present disclosure, wherein the outer peripheries of the gold nanoclusters of the nano dye molecules are further covered by 3 to 10 of the alkyl ammonium bromide molecules, and the alkyl ammonium bromide molecules are at least one selected from the group consisting of tetrabutylammonium bromide, tetrahexylammonium bromide, and tetraoctylammonium bromide.

In a third aspect, the present disclosure further provides a display panel. The display panel comprises the above color filter.

Beneficial Effect

Compared to current technology, the present disclosure provides a nano dye molecule by using a gold nanocluster as a central group and covering dye molecules on an outer periphery of the gold nanocluster by gold-sulfur bonds to obtain nano dye molecules having stable and uniform sizes. The dye molecules have very small scattering effect in the light path, and a color filter made thereof has a high transmittance, thereby making a liquid crystal panel manufactured thereof has a high contrast.

DESCRIPTION OF DRAWINGS

The accompanying FIGURES to be used in the description of embodiments of the present disclosure or prior art will be described in brief to more clearly illustrate the technical solutions of the embodiments or the prior art. The accompanying FIGURES described below are only part of the embodiments of the present disclosure, from which those skilled in the art can derive further FIGURES without making any inventive efforts.

The FIGURE is a schematic three-dimensional configuration diagram of a nano dye molecule according to an embodiment of the present disclosure.

DETAILED DESCRIPTION OF PREFERRED EMBODIMENTS

The embodiments of the present disclosure are described in detail hereinafter. Examples of the described embodiments are given in the accompanying drawings. The specific embodiments described with reference to the attached drawings are all exemplary and are intended to illustrate and interpret the present disclosure. Based on the embodiments in the present disclosure, all other embodiments obtained by those skilled in the art without creative efforts are within the scope of the present disclosure.

In this disclosure, the word "exemplary" is used to mean "serving as an example, illustration, or description". Any embodiment described as "exemplary" in this disclosure is not necessarily to be construed as a preferred or an advantageous embodiment over other embodiments. In order to enable any person skilled in the art to implement and use the present disclosure, the description is given as follows. In the following description, details are set forth for the purpose of explanation. It should be understood by one of ordinary skill in the art that the present disclosure may be implemented without use of these specific details. In other embodiments, well-known structures and procedures are not described in detail to avoid obscuring the description of the present disclosure with unnecessary details. Accordingly, the present disclosure is not intended to be limited to the embodiments shown, but is to be accorded the widest scope consistent with the principles and features disclosed herein.

An embodiment of the present disclosure provides a nano dye molecule. It is described in detail in the following.

The nano dye molecule comprises:
a gold nanocluster; and
a plurality of dye groups connected to the gold nanocluster by gold-sulfur bonds and covering an outer periphery of the gold nanocluster.

Further, a structure of the nano dye molecules is represented by a following formula (1):

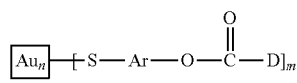

wherein $Au_n$ represents the gold nanocluster, and n is an integer ranging from 100 to 300;

Ar is an alkyl group having 2 to 12 carbon atoms, and in general, Ar is a linear alkyl group;

D is a dye group, that is, a group that imparts a desired color to the nano dye molecule; and m is an integer ranging from 5 to 20.

In some embodiments, the nano dye molecule further comprises polyethylene glycol groups, wherein the polyethylene glycol groups are connected to the gold nanocluster by gold-sulfur bonds and cover the outer periphery of the gold nanocluster, so the steric hindrance of polyethylene glycol enables the stable existence of nano dye molecule spheres without aggregation, and improves stability and uniformity of the size of the nano dye molecule spheres. In addition, the polyethylene glycol groups have carboxyl groups at their ends, and the carboxyl groups are used to adjusting developing performance of the dye molecules to facilitate subsequent manufacture of color filters.

Further, the structure of the nano dye molecules is represented by a following formula (2):

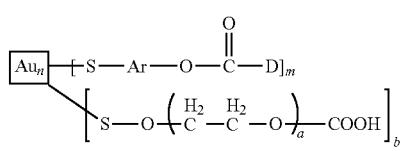

wherein $Au_n$ represents the gold nanocluster, and n is an integer ranging from 100 to 300;

Ar is an alkyl group having 2 to 12 carbon atoms;

D is a dye group;

m is an integer ranging from 5 to 20;

a is an integer ranging from 10 to 100; and b is an integer ranging from 3 to 10.

In some embodiments, the outer periphery of the gold nanocluster of any one of the nano dye molecules is further covered by a plurality of alkyl ammonium bromide molecules to make an electrostatic repulsive force is formed between any of the adjacent nano dye molecules, which can substitute for the steric hindrance of the above polyethylene glycol, and similarly, can enable the stable existence of nano dye molecule spheres without aggregation and improve stability and uniformity of the size of the nano dye molecule spheres.

Further, the outer periphery of the gold nanocluster of one of the nano dye molecules is further covered by 3 to 10 of the alkyl ammonium bromide molecules, and the alkyl ammonium bromide molecules are at least one selected from the group consisting of tetrabutylammonium bromide, tetrahexylammonium bromide, and tetraoctylammonium bromide.

In some embodiments, the dye groups are one selected from the group consisting of red dye groups, green dye groups, blue dye groups, yellow dye groups, and white dye groups.

Exemplarily, a structure of the dye groups may be one selected from the group consisting of following structural formulas:
D1
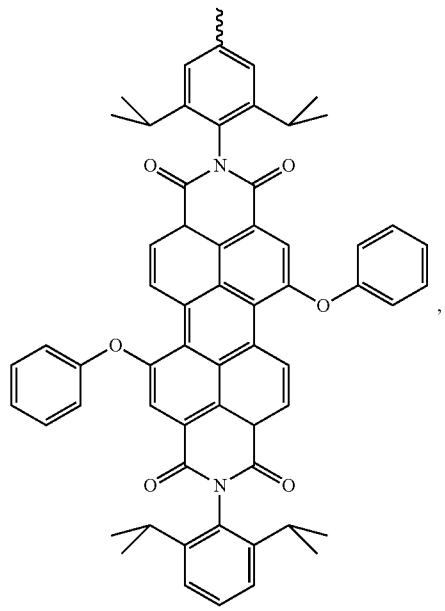
D2
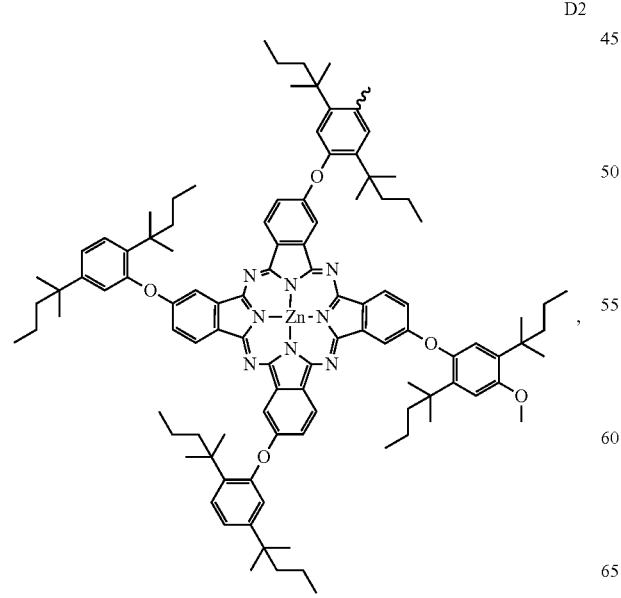
D3
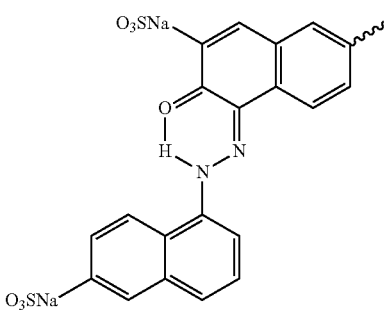
D4
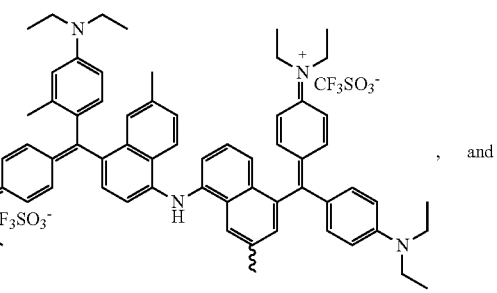
, and
D5
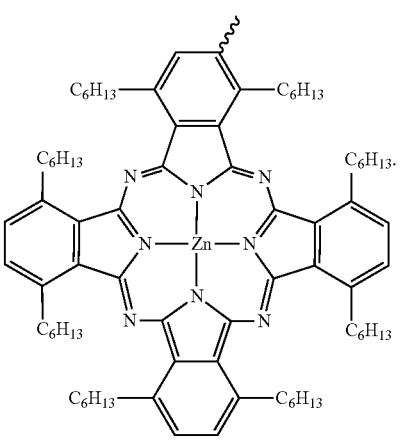

The following exemplarily gives specific embodiments for explanation and provides a nano dye molecule manufacturing process. The process comprises:

manufacturing a di-pigment molecular compound ligand by a condensation reaction:

a carboxyl group substituted pigment derivative (taking following compound 1 for example) and a 2,2'-dithiodiethanol derivative (taking following compound 2 for example) are dissolved in tetrahydrofuran in a molar ratio of 2:1. In the mixed solution, a concentration of the pigment derivative is 0.1 mol/L, and a concentration of the 2,2'-dithiodiethanol derivative is 0.05 mol/L. A condensing agent of 2-(7-azabenzotriazol-1-yl)-N,N,N',N'-tetramethyluronium hexafluorophosphate, a condensation activator of 1-hydroxy-7-azabenzotriazole, and a catalyst of 4-N, N-dimethylpyridine are added to react after temperature is decreased to 0° C. in an ice water bath, then the temperature is increased to 40° C., and the reaction solution is stirred for 1 hour until the reaction is complete, wherein a chromatographic plate monitors the reaction progress. The obtained product is subjected to extraction, filtration, and column chromatography to obtain a pure reaction product as following compound 3.

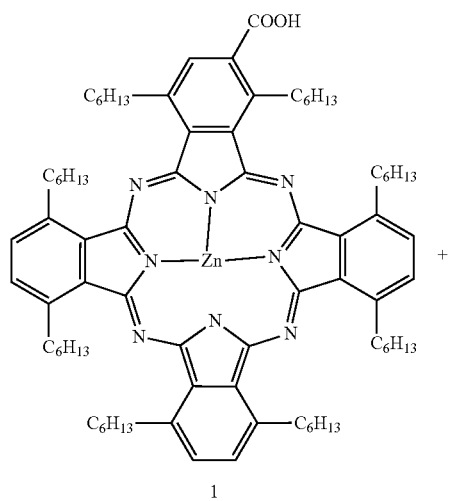

1

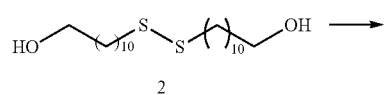

2

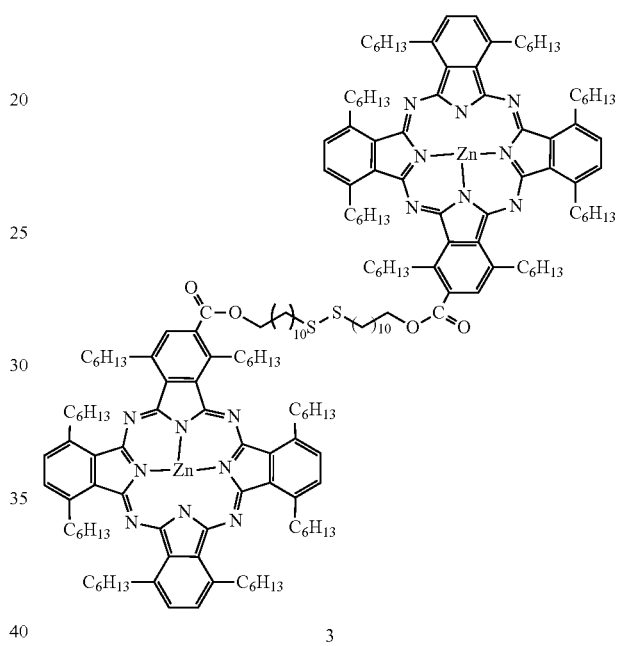

3

Then manufacturing nano dye molecules:

The above manufactured di-pigment molecular compound ligand (that is compound 3) is dissolved in a 4 mL of tetrahydrofuran to form a solution having a concentration of 0.05 mol/L. A mercapto-polyethylene glycol-carboxyl acid terminal derivative (its molecular weight is 2000 Da) is dissolved in an 8 mL of tetrahydrofuran to form a solution having a concentration of 0.1 mol/L. The two solutions are mixed and stirred for 5 minutes at room temperature. Chloroauric acid is dissolved in a 4.8 mL of tetrahydrofuran to form a solution having a concentration of 0.05 mol/L, then is added to the above reactive mixed solution, and is stirred for 5 minutes. In the continued stirring, a sodium borohydride aqueous solution is added, and the solution is stirred overnight at room temperature in the dark. Then nano dye molecules A1 are obtained after centrifuging the solution at 14000 rpm for 30 minutes. The three-dimensional configuration of the nanomolecule A1 is shown in the FIGURE. It can be known from the FIGURE, the dye groups and the polyethylene glycol groups are as ligands covering the outer peripheries of the gold nanoclusters.

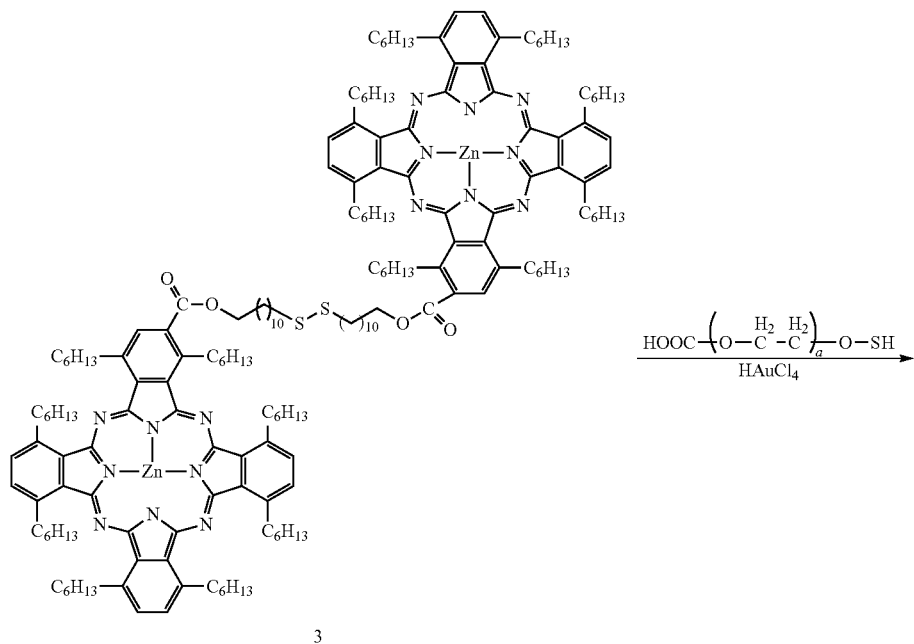

3

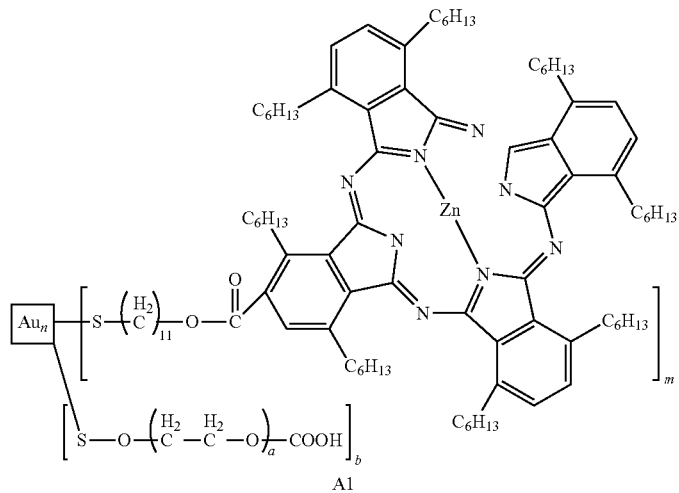

A1

In another embodiment, the alkyl ammonium bromide molecules are used to substitute for the above polyethylene glycol groups. Specifically, the manufacturing process of the nano dye molecules comprises:

using the same method as above to manufacturing the di-pigment molecular compound ligand, that is compound 3.

Then chloroauric acid is dissolved in a 7 mL of water to form a light yellow solution having a concentration of 0.05 mol/L, tetrahexylammonium bromide is dissolved in a 20 mL of toluene to form a solution having a concentration of 0.2 mol/L, and then the two solution are mixed to obtain a crimson mixed solution. The mixed solution is stirred for 20 minutes, and then the water phase is removed and the solution of toluene phase is retained after the water phase becomes clear. The above obtained compound 3 (12.5 mg) is added to the toluene phase and stirred for 10 minutes, then a new prepared sodium borohydride solution (which is dissolved in a 7 mL of water to from a solution having a concentration of 0.03 mol/L) is added quickly and stirred for 3 hours, and a chromatographic column is used to separate and purify the product, wherein the eluent is toluene: ethanol=90:10. The following nano dye molecule A2 is then obtained by spin dry.

The dye group ligands are connected to the gold nanoclusters by gold-sulfur bonds and cover the outer peripheries of the gold nanoclusters. Meanwhile, tetrahexylammonium bromides are distributed on the outer peripheries of the gold nanoclusters to form electrostatic repulsive forces between the adjacent nano dye molecules. It should be noted that four dye group ligands and four tetrahexylammonium bromides are exemplarily shown in the following structural formula, but this is not a specific limitation. Different numbers of ligands can be achieved by adjusting ratios of reactants according to actual needs.

A2

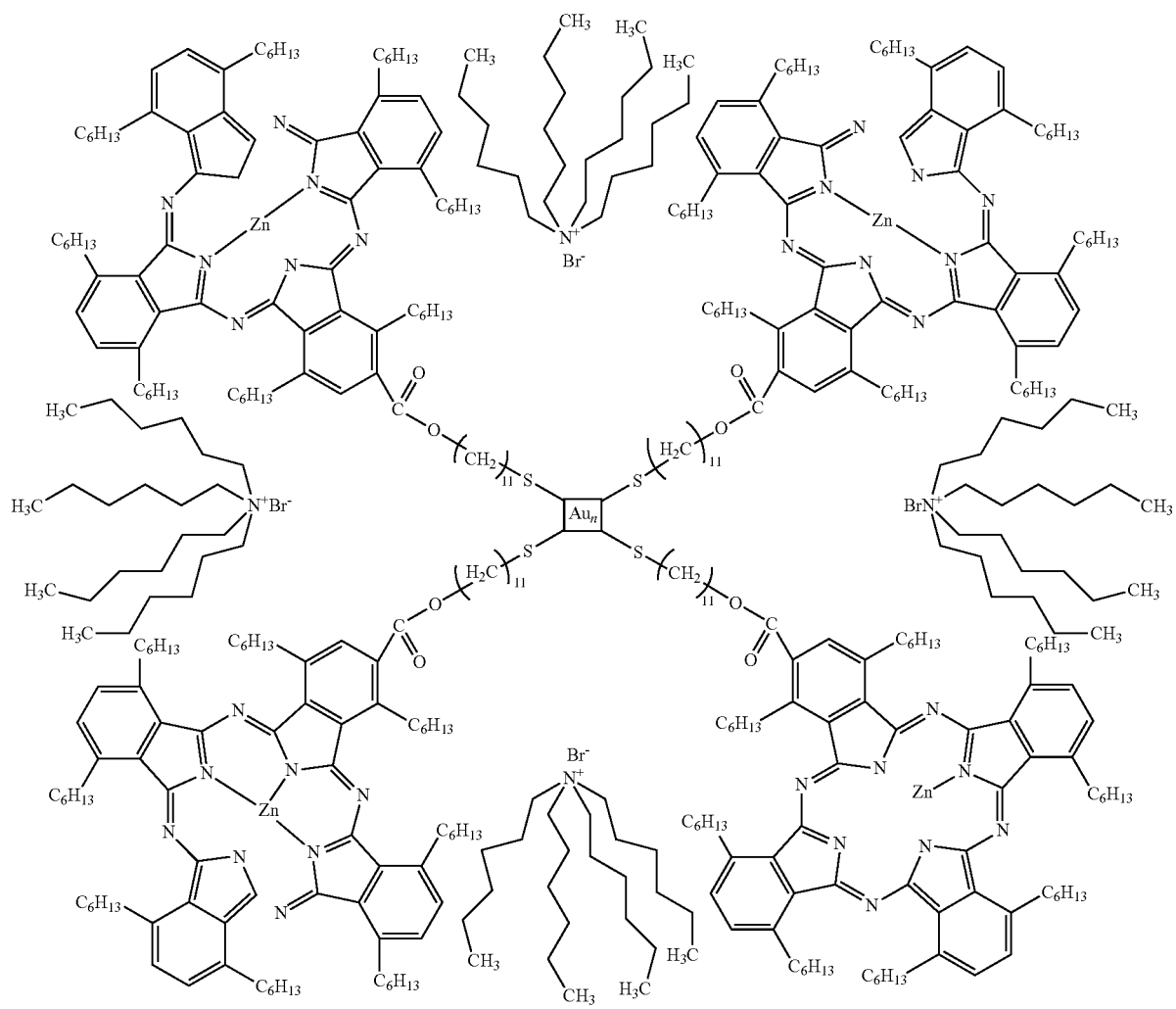

After measurement, the particle sizes of the nano dye molecules A1 and A2 prepared above are both about 4 nm. In addition, the steric hindrance of the polyethylene glycol ligands and the electrostatic repulsive forces formed by the alkyl ammonium bromide molecules enable the stable existence of nano dye molecule spheres without aggregation, and make the sizes of the nano dye molecule spheres have higher stability and uniformity.

Another embodiment of the present disclosure further provides a color filter. The color filter comprises the above nano dye molecule, and color filters having different colors are manufactured in sequence according to different colors of the nano dye molecules.

Specifically, raw materials for manufacturing the color filter comprise the above nano dye molecule, an adhesive resin, a photoinitiator, a polymerizable monomer, a solvent, a dispersant, and other additives, such as a thermal polymerization inhibitor, a foam inhibitor, and a leveling agent, to mix for preparing a photoresist solution. Wherein, the adhesive resin may be an acrylic resin, the photoinitiator may be benzophenone, the polymerizable monomer may be polyhydric alcohol acrylate, the solvent may be PGMEA, and the dispersant may be polystyrene-polyacrylic acid diblock copolymer (PS-PAA), wherein a mass percentage of the nano dye molecules usually ranges from 2% to 8%.

Since the sizes of the nanoparticles are small and uniform, light almost has no scattering effect in the path. Therefore, the color filter manufactured by using the above obtained photoresist solution has a high transmittance. In addition, due to good dispersibility and size advantage, a coating method and an inkjet printing method can be used when manufacturing a color filter, which saves photoresist raw materials and is suitable for commercial application.

Another embodiment of the present disclosure further provides a display panel. The display panel comprises the above color filter. Since the above color filter has a higher transmittance, the obtained display panel has a better contrast.

In the above embodiments, the description of each embodiment has its own emphasis. For the parts that are not described in detail in an embodiment, refer to the detailed description of other embodiments above, which will not be repeated here.

The nano dye molecule, the color filter, and the display panel provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A nano dye molecule, comprising:
   a gold nanosphere; and
   a plurality of dye groups connected to the gold nanosphere by gold-sulfur bonds and covering an outer periphery of the gold nanosphere;
   wherein a structure of the nano dye molecule is represented by a following formula (1):

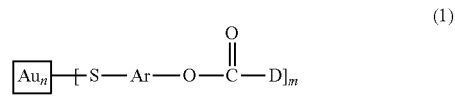

(1)

wherein $Au_n$, represents the gold nanosphere, and n is an integer ranging from 100 to 300;
   Ar is an alkyl group having 2 to 12 carbon atoms;
   D is a dye group; and
   m is an integer ranging from 5 to 20.

2. The nano dye molecule according to claim 1, wherein the dye groups are one selected from a group consisting of red dye groups, green dye groups, blue dye groups, yellow dye groups, and white dye groups.

3. The nano dye molecule according to claim 1, wherein a structure of the dye groups is one selected from a group consisting of following structural formulas:

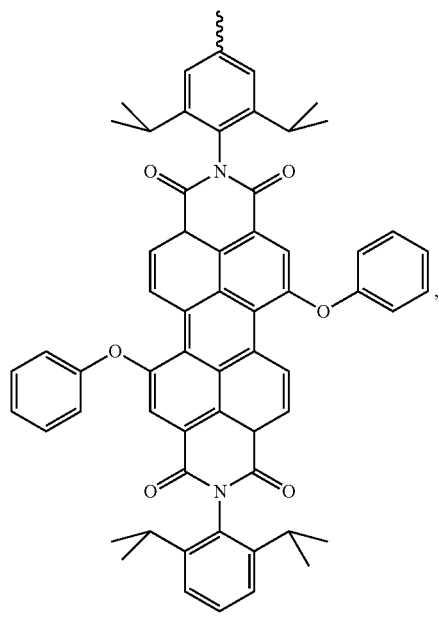

D1

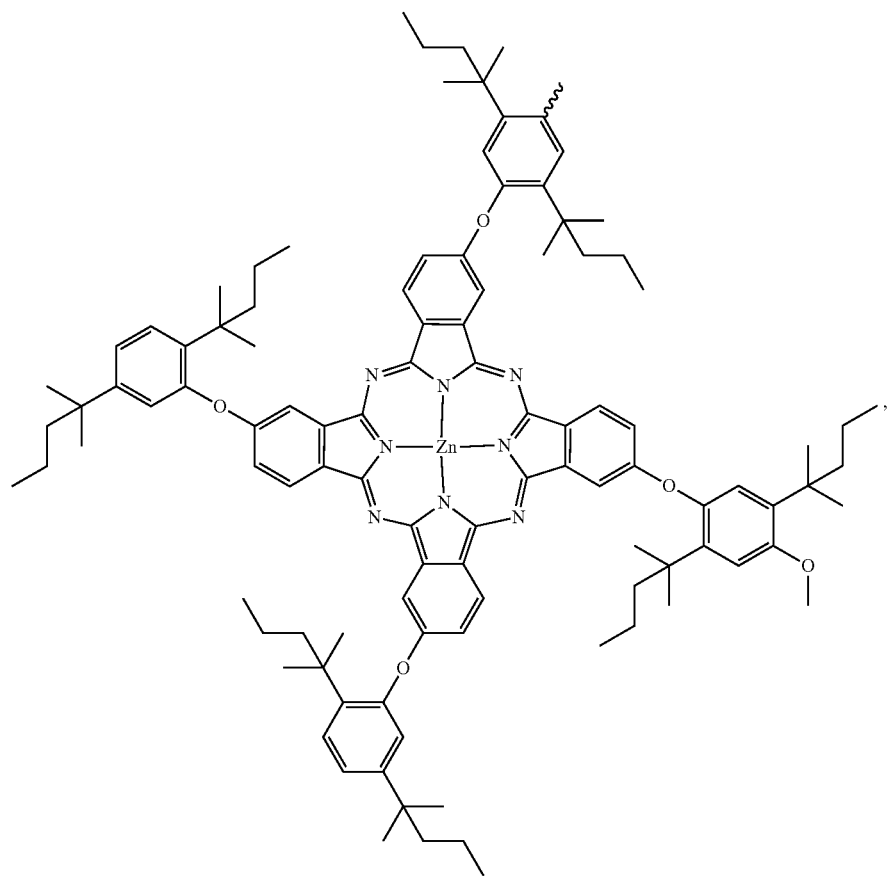
D2
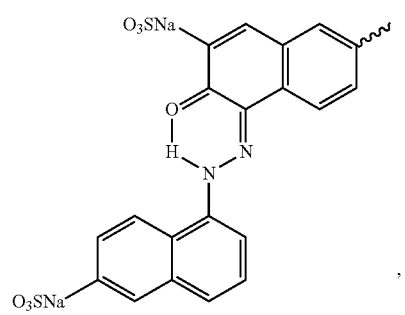
D3
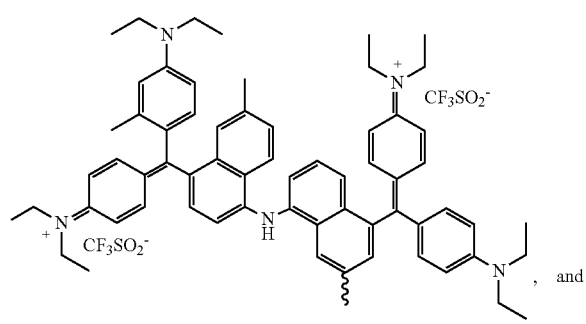
D4

-continued

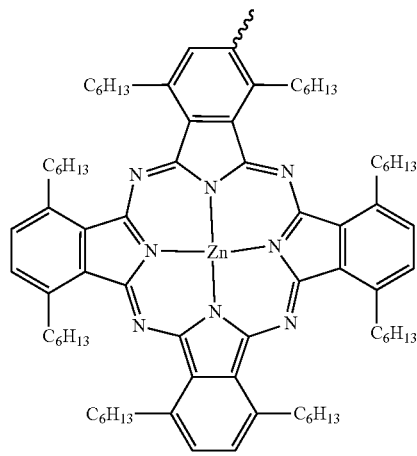

4. The nano dye molecule according to claim 1, comprising polyethylene glycol groups, wherein the polyethylene glycol groups are connected to the gold nanosphere by gold-sulfur bonds, cover the outer periphery of the gold nanosphere, and have carboxyl groups at ends of the polyethylene glycol groups.

5. The nano dye molecule according to claim 4, wherein a structure of the nano dye molecule is represented by a following formula (2):

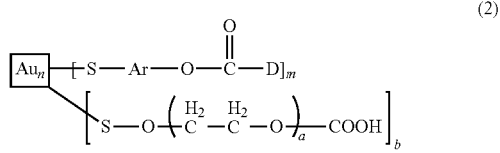

wherein $Au_n$ represents the gold nanosphere, and n is an integer ranging from 100 to 300;
Ar is an alkyl group having 2 to 12 carbon atoms;
D is a dye group; and
m is an integer ranging from 5 to 20;
a is an integer ranging from 10 to 100; and
b is an integer ranging from 3 to 10.

6. The nano dye molecule according to claim 1, wherein the outer periphery of the gold nanosphere of the nano dye molecule is further covered by a plurality of alkyl ammonium bromide molecules.

7. The nano dye molecule according to claim 6, wherein the outer periphery of the gold nanosphere of the nano dye molecule is further covered by 3 to 10 of the alkyl ammonium bromide molecules, and the alkyl ammonium bromide molecules are at least one selected from a group consisting of tetrabutylammonium bromide, tetrahexylammonium bromide, and tetraoctylammonium bromide.

8. A color filter, comprising nano dye molecules, wherein each of the nano dye molecules comprises:
a gold nanosphere; and
a plurality of dye groups connected to the gold nanosphere by gold-sulfur bonds and covering an outer periphery of the gold nanosphere;

wherein a structure of the nano dye molecule is represented by a following formula (1):

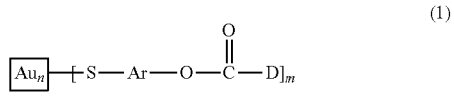

wherein $Au_n$ represents the gold nanosphere, and n is an integer ranging from 100 to 300;
Ar is an alkyl group having 2 to 12 carbon atoms;
D is a dye group; and
m is an integer ranging from 5 to 20.

9. The color filter according to claim 8, wherein a mass percentage of the nano dye molecules in a photoresist solution for manufacturing the color filter ranges from 2% to 8%.

10. The color filter according to claim 8, wherein the dye groups are one selected from a group consisting of red dye groups, green dye groups, blue dye groups, yellow dye groups, and white dye groups.

11. The color filter according to claim 8, wherein each of the nano dye molecules further comprises polyethylene glycol groups, wherein the polyethylene glycol groups are connected to the gold nanosphere by gold-sulfur bonds, cover the outer periphery of the gold nanosphere, and have carboxyl groups at ends of the polyethylene glycol groups.

12. The color filter according to claim 8, wherein the outer periphery of the gold nanosphere of each of the nano dye molecules is further covered by a plurality of alkyl ammonium bromide molecules.

13. The color filter according to claim 12, wherein the outer periphery of the gold nanosphere of each of the nano dye molecules is further covered by 3 to 10 of the alkyl ammonium bromide molecules, and the alkyl ammonium bromide molecules are at least one selected from a group consisting of tetrabutylammonium bromide, tetrahexylammonium bromide, and tetraoctylammonium bromide.

14. A display panel, comprising the color filter according to claim 8.

* * * * *